(12) United States Patent
Menten

(10) Patent No.: US 7,805,757 B2
(45) Date of Patent: Sep. 28, 2010

(54) CONTROL OF COMMUNICATION SESSION ATTRIBUTES IN NETWORK EMPLOYING FIREWALL PROTECTION

(75) Inventor: Lawrence Edwin Menten, Short Hills, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1308 days.

(21) Appl. No.: 11/323,743

(22) Filed: Dec. 30, 2005

(65) Prior Publication Data

US 2007/0156911 A1    Jul. 5, 2007

(51) Int. Cl.
G06F 7/04 (2006.01)
G06F 9/00 (2006.01)
G06F 15/173 (2006.01)
G06F 15/16 (2006.01)
H04W 40/00 (2009.01)
H04L 9/32 (2006.01)
H04L 29/06 (2006.01)

(52) U.S. Cl. .............. 726/12; 726/11; 726/13; 726/5; 709/224; 709/228; 455/445

(58) Field of Classification Search ............. 726/12
See application file for complete search history.

(56) References Cited

U.S. PATENT DOCUMENTS

2007/0072617 A1*   3/2007   Lewis et al. ............... 455/445

2007/0192846 A1*   8/2007   Thai et al. ................. 726/12

FOREIGN PATENT DOCUMENTS

WO       WO 03055136 A1 *   7/2003

OTHER PUBLICATIONS

O'Guin, S.; Williams, C.K.; Selimis, N.; "Application of virtual private networking technology to standards-based management protocols across heterogeneous firewall-protected networks", Military Communications Conference Proceedings, 1999. IEEE vol. 2, Publication Year: May 1999, pp. 1251-1255.*

* cited by examiner

*Primary Examiner*—Michael Pyzocha
*Assistant Examiner*—Courtney D Fields
(74) *Attorney, Agent, or Firm*—Ryan, Mason & Lewis, LLP

(57) ABSTRACT

Techniques are disclosed for centralized control of one or more attributes associated with a communication session in a network containing firewalls. By way of example, a technique for controlling an attribute associated with a communication session in a data communication network includes the following steps. The attribute associated with the communication session is monitored at a first computing device, wherein the first computing device includes a functionally centralized controller. The first computing device determines which computing devices in the data communication network are to be made aware of the monitored attribute. At least one of the computing devices to be made aware of the monitored attribute includes a firewall. The first computing device sends a message to each computing device identified in the determining step.

19 Claims, 3 Drawing Sheets

CONTROL OF COMMUNICATION SESSION ATTRIBUTES IN NETWORK EMPLOYING FIREWALL PROTECTION

FIELD OF THE INVENTION

The present invention relates generally to the field of data communication networks and, more particularly, to techniques for control of one or more attributes associated with a communication session in a data communication network employing firewall protection.

BACKGROUND OF THE INVENTION

In wireless data communication networks, such as a General Packet Radio Service (GPRS) based network or a Universal Mobile Telecommunications System (UMTS) based network, a tunneling protocol may be used to set up communication paths between two or more computing devices. One or more tunnels may be established for the duration of the communication time period, such time period generally being referred to as a session. When a session terminates or ends, the one or more tunnels associated with the session are terminated.

Such tunnels may also generally operate in the presence of firewalls. As is known, firewalls are a primary mechanism for keeping a computer secure from remote hackers. In general, a firewall allows, i.e., passes, or blocks, i.e., rejects, traffic into and out of a private network or a computer of a user. Firewalls are widely used to give users access to networks such as the Internet, while blocking unauthorized attempts to access a user's computer or network. A firewall may also be used to separately control access to a public server of an organization as opposed to its internal private network.

In a session with multiple communicating computers, each having their own firewall protection, it is important that certain information associated with the communication session be reliably communicated among the participating firewalls. For example, in the case where the information corresponds to the occurrence of an event causing termination of the session, e.g., tearing down of a tunnel used during the session, occurrence of such termination event needs to be reliably communicated among the firewalls of the computers of the session so that the session can be properly terminated.

One existing solution is provided in the NetScreen™ firewall product available from Juniper Networks of Sunnyvale, Calif. In a network using such a firewall product, one firewall protecting a first computing device can be used to communicate termination of a session to other firewalls protecting other computing devices that use a particular Internet Protocol (IP) address, upon the detection of the termination of the tunnel, known in a GPRS network as a GPRS tunnel protocol (GTP) tunnel, through which the session using that IP address has been tunneled.

However, at least one problem with the Juniper NetScreen™ firewall approach is that a firewall itself is attempting to communicate termination of a session to other firewalls. Firstly, a firewall may typically reside on a computing device with limited processing capacity. Thus, to require a firewall to communicate session termination to other firewalls can be prohibitive from a processing capacity perspective. Secondly, a Juniper NetScreen™ firewall stores only a static, predetermined topology of the network and, thus, has no way of reliably communicating a session termination event to all firewalls that may be participating in a session. That is, the nature of a session may be that computer devices join after the session begins and leave before the session ends. Thus, the predetermined topology that the Juniper NetScreen™ firewall stores is inadequate to permit the firewall to reliably communicate a session termination event to all firewalls that should be notified of the event.

SUMMARY OF THE INVENTION

The problems with existing firewalls are overcome, in accordance with principles of the present invention, by providing for centralized control of one or more attributes associated with a communication session in a network containing firewalls so that such attributes can be reliably communicated to one or more firewalls participating in the communication session.

It is to be understood that the term "attribute" is intended to generally refer to an event associated with a communication session, by way of example only, the occurrence of the termination of the communication session or occurrence of a change in bandwidth allocation for the communication session. However, the invention is not intended to be limited to a particular attribute.

By way of example, in one aspect of the invention, a technique for controlling an attribute associated with a communication session in a data communication network includes the following steps. The attribute associated with the communication session is monitored at a first computing device, wherein the first computing device includes a functionally centralized controller. The first computing device determines which computing devices in the data communication network are to be made aware of the monitored attribute. At least one of the computing devices to be made aware of the monitored attribute includes a firewall. The first computing device sends a message to each computing device identified in the determining step.

The first computing device may be a server. The attribute may be an occurrence of a communication session termination event. The termination event may represent a closure of a communication tunnel with which the communication session is associated. The tunnel may be a GPRS tunnel or a UMTS tunnel. One or more of the monitoring, determining, and sending steps may be performed in the presence of a network address translation operation.

Further, the attribute controlling technique may include resending the message from the first computing device to a computing device identified in the determining step when the first computing device does not receive an acknowledgment of receipt of the message from the computing device.

Still further, the attribute controlling technique may further include selecting at a user interface associated with the first computing device one or more monitoring points in the data communication network.

Advantageously, the above-mentioned problems associated with existing firewall approaches are overcome, since the first computing device includes a functionally centralized controller of attributes associated with a communication session and, thus, an individual firewall is not relied upon to communicate session attributes such as session termination to other firewalls participating in the communication session.

DETAILED DESCRIPTION OF PREFERRED EMBODIMENTS

It is to be appreciated that while the present invention will be described below in the context of a firewall-based environment of a GPRS/UMTS communication network, the invention is not so limited. That is, the present invention is more generally applicable to any data communication network in which it would be desirable to provide techniques for centralized control of one or more attributes associated with a communication session in a firewall-based environment.

As will be explained in illustrative detail herein, principles of the invention provide for centralized control of an attribute associated with a communication session in a data communication network. In one illustrative embodiment, the network is a GPRS network and the attribute being centrally controlled is a session termination event that occurs upon the termination of a GTP tunnel associated with the session. However, it is to be appreciated that principles of the invention can be used in other networks and to control other attributes. By way of one alternative example only, the controlled attribute can be allocation of bandwidth associated with the communication session.

In one illustrative embodiment, the event of a termination of a GTP tunnel is communicated through a central server. The central server is the computing device that provides functionally centralized control of communication session attributes. Such an arrangement simplifies the administration of the feature, allows the efficient delivery of a termination request to firewalls distributed across the network, and allows sessions to be tracked and terminated across a Network Address Translation or NAT boundary. Furthermore, an illustrative embodiment may use acknowledgments and retransmissions, as will be explained, which makes the signaling of GTP tunnel closure and the signaling of the request for session termination reliable. It is also to be understood that the network may have more than one central server, i.e., a central server for each part of the network.

Figure 1:
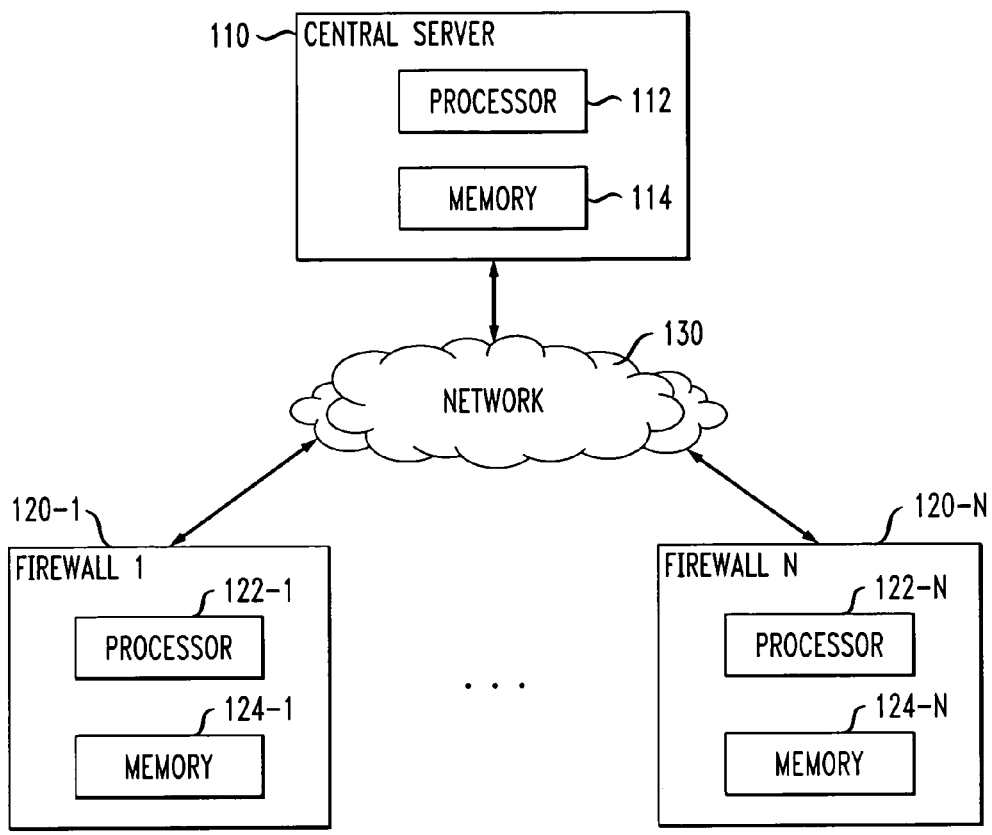
FIG. 1 is a block diagram illustrating a system for centrally controlling communication session attributes, according to one embodiment of the invention.

Referring initially to FIG. 1, a block diagram illustrates a system for centrally controlling communication session attributes, according to one embodiment of the invention.

As shown in FIG. 1, central server 110 is operatively coupled to firewall computing devices 120-1 through 120-N, where N represents the number of firewalls in the system, via network 130. Network 130 may represent a public network such as the Internet or World Wide Web, a private network such as one operated by an organization, e.g., a company or business, or some combination of public and private network. Firewalls 120-1 through 120-N communicate with central server 110 over network 130. The firewalls may also communicate with one another over the network as well.

Thus, central server 110 monitors a communication session and upon detection of an occurrence of a session termination event, e.g., due to a GTP tunnel closure associated with the session, distributes a termination request to one or more of firewalls 120-1 through 120-N distributed across network 130. Central server 110 may await acknowledgments of receipt from each firewall to which it sends a termination request. If such acknowledgment is not received from a firewall, central server 110 may retransmit the request to the non-responsive firewall. These steps/operations are further illustrated below in the context of FIG. 2.

Furthermore, it is to be appreciated that use of the central server also allows sessions to be centrally tracked and terminated, even in the presence of a network address translation operation.

As further shown in FIG. 1, central server 110 includes processor 112 and memory 114. Similarly, each of firewalls 120-1 through 120-N include a processor 122-1 through 122-N, respectively, and a memory 124-1 through 124-N, respectively. Each computing device, i.e., server 110 and firewalls 120, utilizes its processor and memory to perform steps, functions, operations, calculations, etc.

It is to be appreciated that the term "processor" as used herein is intended to include any processing device, such as, for example, one that includes a central processing unit or CPU and/or other processing circuitry, e.g., digital signal processor or DSP, microprocessor, etc. Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory or RAM, read only memory or ROM, fixed storage media, e.g., hard drive, removable storage media, e.g., diskette, flash memory, etc.

In addition, while not expressly shown, each computing device, i.e., server 110 and firewalls 120, may include one or more input devices, e.g., keyboard, mouse, etc., for inputting data to the processing unit, as well as one or more output devices, e.g., CRT display, etc., for providing results associated with the processing unit. It is to be appreciated that such input and output devices may be one mechanism for a network administrator to interface with the central server and/or the firewalls. Alternatively, inputs could be read into the system from a diskette or from some other source, e.g., another computer system, connected thereto. Also, inputs to the methodologies may be obtained in accordance with the one or more input devices. The output devices may be one mechanism for a user or other computer system to be presented with results of the methodologies of the invention.

Still further, while not expressly shown, each computing device, i.e., server 110 and firewalls 120, may include one or more components capable of allowing the computing system to communicate with other computing systems. Thus, the network interface may comprise a transceiver configured to communicate with a transceiver of another computer system via a suitable communication protocol. It is to be understood that the invention is not limited to any particular communication protocol.

Accordingly, one or more computer programs, or software components thereof, including instructions or code for performing the methodologies of the invention, as described herein, may be stored in one or more of the associated storage media, e.g., ROM, fixed or removable storage, of the memory and, when ready to be utilized, loaded in whole or in part, e.g., into RAM, and executed by the processor.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuits, functional circuitry, etc. Given the techniques of the invention provided herein, one of ordinary skill in the art will be able to contemplate other implementations of the techniques of the invention.

Figure 2:
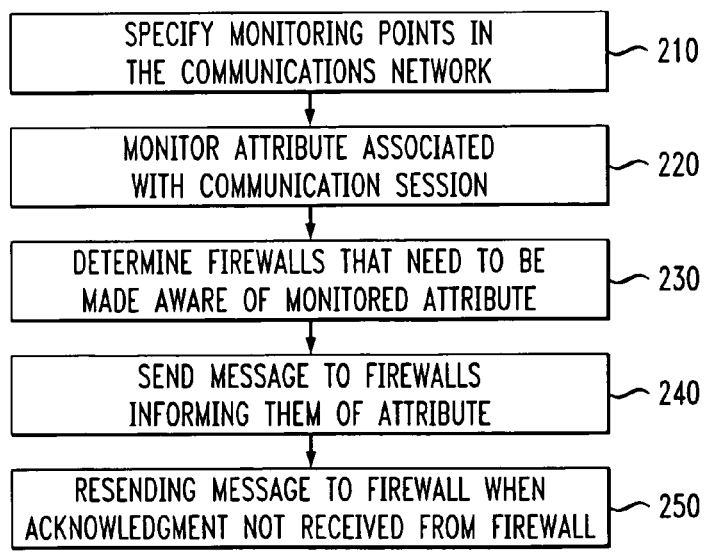
FIG. 2 is a flow diagram illustrating a methodology for centrally controlling communication session attributes, according to one embodiment of the invention.

Referring now to FIG. 2, a flow diagram illustrates a methodology for centrally controlling communication session attributes, according to one embodiment of the invention. It is to be appreciated that such methodology may be implemented via central server 110 (FIG. 1).

In step 210, a network administrator specifies monitoring points in the communication network. This may be accomplished via a graphical user interface or GUI associated with central server 110. Monitoring points are generally locations in the network from which the central server receives session information and, thus, locations in the network where the central server monitors session attributes such as the occurrence of a session termination event. These monitoring points will be further illustrated in the context of FIG. 3 below.

Once the monitoring points have been specified, in step 220, the central server monitors one or more attributes associated with the communication session.

Assuming receipt of attribute information that needs to be communicated, e.g., a session termination event, in step 230, the central server determines which firewalls, e.g., firewalls 120-1 through 120-N, that need to be made aware of the monitored attribute.

In step 240, the central server sends a message, e.g., termination request, to the appropriate firewalls informing them of the attribute.

In step 250, if an acknowledgment is not received from a firewall to which the message was sent, the message is resent in step 250. The iterative process of acknowledgment failure/retransmission can be repeated a specified number of times before a network administrator is contacted to obtain further instruction.

Figure 3:
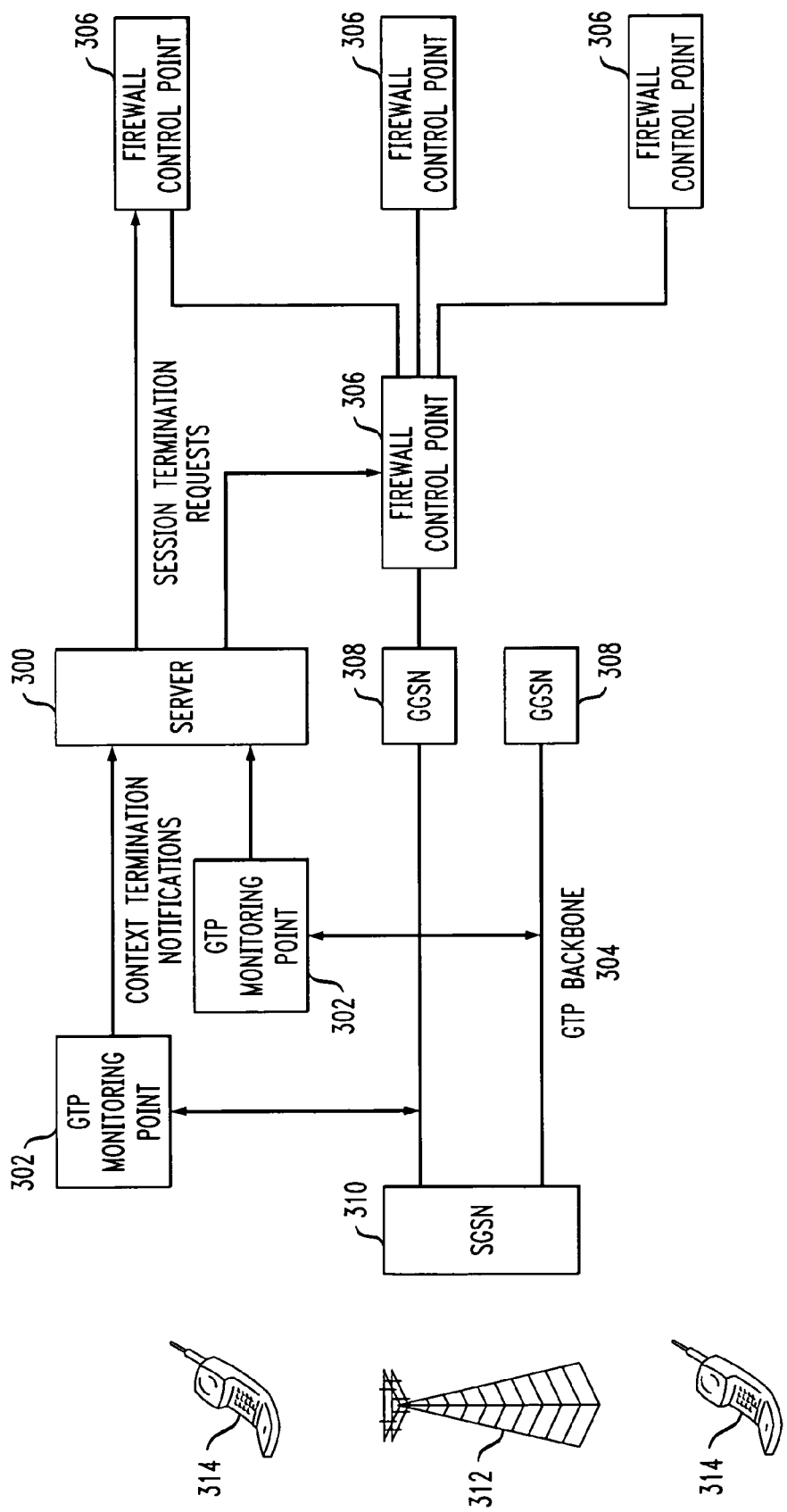
FIG. 3 is a block diagram illustrating a system for centrally controlling communication session attributes, according to another embodiment of the invention.

Referring now to FIG. 3, a block diagram illustrates a system for centrally controlling communication session attributes, according to another embodiment of the invention.

In this embodiment, a secure management channel between a central server and each firewall is used to reliably collect announcements of tunnel termination events at the central server. The central server determines the destination security zones and firewall instances to which the events are to be delivered, and reliably delivers session termination events to those firewalls.

More particularly, FIG. 3 illustrates the centrally controlled session termination feature of the invention in a GPRS/UMTS network. As shown, server 300 functions as the central server that controls the session termination feature. Server 300 is operatively coupled to monitoring points 302 which are selectively located across the GTP backbone 304. Server 300 is also operatively coupled to firewall control points 306. It is to be appreciated that each monitoring point and control point may be implemented via a separate computing device, with its own dedicated processor and memory, such as the VPN Firewall Brick™ available from Lucent Technologies Inc. of Murray Hill, NJ. However, other devices with which server 300 can communicate may be employed. It is to be understood that the firewall control points operate to provide the firewall processing services that the network employs, e.g., similar to firewalls 120-1 through 120-N in FIG. 1.

Also shown in FIG. 3 are exemplary components of the GPRS/UMTS network, i.e., gateway GPRS support nodes or GGSNs 308, serving GPRS support node or SGSN 310, base station 312, and wireless user devices 314. As is known, the SGSN acts as an interface between user devices 314/base station 312 and the network formed by the GTP backbone 304. Further, as is known, the GGSNs act as interfaces between the network formed by the GTP backbone 304 and the external packet data network. The external network, not expressly shown in FIG. 3, is separated from the GTP backbone by firewall control points 306. That is, the firewall processing features of the firewall control points protect the internal network and its users 314 from attacks originating from the external network.

In this particular illustrative embodiment, the centrally controlled session termination feature of the invention provided in accordance with server 300 is referred to as the GTP PDP context deletion monitor feature. It is known that the GTP-C protocol is the control section of the GTP standard. When a subscriber requests a packet data protocol or PDP context, the SGSN will send an Activate PDP Context GTP-C message to the GGSN giving details of the subscriber's request. The GGSN will then respond with an Activate PDP Context Response message which will either give details of the PDP context actually activated or will indicate a failure and give a reason for that failure. On the other hand, GTP-U functions as an IP based tunnelling protocol which permits many tunnels between each set of end points. Typically, when used in a UMTS network, each subscriber will have one or more tunnels, one for each PDP context they have active, plus possibly separate tunnels for specific connections with different quality of service requirements.

As explained herein, the centrally controlled session termination feature of the invention provides enhanced security for GPRS/UMTS networks by coordinating the termination of firewall sessions on the Gi interface with the termination of the associated GTP PDP contexts on the GPRS/UMTS Gn backbone. It is to be understood that the "Gi interface" generally refers to the functional interface between the GGSNs 308 and the external network, while the "Gn backbone" refers to the GTP backbone 304.

The GTP PDP context deletion monitor feature thus addresses vulnerabilities with known theft-of-service and over-billing exploits, as well as providing a mechanism to tighten security related to GPRS/UMTS traffic on the non-backbone areas of a service provider's network. Since the feature provides more rapid and reliable notification of session termination, firewall resources and dynamically assigned IP addresses are freed more rapidly, providing network performance benefits and reducing the associated costs to the network operator. The ability to operate either in-line or as a passive tap (as will be explained below), the support for multiple backbone monitoring points, and the zone-based definition of feature control points allow the feature to be scaled to support very large GPRS/UMTS networks with complex topologies and multiple firewall layers. Furthermore, because the feature is under the centralized control of a management server, such as server 300, the feature is able to track and terminate sessions whose source IP address has been translated by a firewall in the network path.

The GTP PDP context deletion monitor feature monitors the deletion of GTPv0 and GTPv1 GTP PDP contexts at one or more points on the GTP backbone and communicates these events to the central server to trigger the deletion of firewall sessions that use the associated IP addresses. The sessions targeted for deletion may traverse other firewalls or other partitions in the same firewall so long as they are managed by the same central server. For the remainder of this description, these monitoring points will be referred to as GTP monitoring points.

The feature associates one or more of such monitoring points on the GTP backbone with one or more control points on the Gi/external network. It is to be appreciated that a control point can represent all appearances of a particular firewall zone on all firewalls hosting an instance of the zone. However, a control point can also represent the appearance of a particular zone on a subset of all of the firewalls hosting an instance of the zone.

The monitoring points in the backbone are associated with traffic flows in the firewall through a GTP application filter instance, as will be further illustrated below. Any GTP application filter instance can be configured to enable the feature and specify the identification number for a particular GTP PDP context deletion monitor with which the GTP monitoring point is to be associated. The controlling central server may support multiple GTP PDP context deletion monitors to provide flexible, fine-grained configuration of the feature. However, a single GTP PDP context deletion monitor will typically be sufficient for most network configurations.

Each GTP PDP context deletion monitor instance supported by the central server receives PDP context deletion events from one or more monitoring points 302 within the GTP UMTS/GPRS backbone. The GTP PDP context deletion monitor instance may be associated with one or more of the firewall control points within the external network. When all of the PDP contexts associated with the particular session have terminated, the central server directs the firewall control points to terminate the sessions associated with the PDP address of the MS or mobile station. A mobile station, e.g., user device 314, might typically be, for example, a data-enabled phone, a personal digital assistant or PDA, or a laptop.

Firewall control points may include a one or more zones and control all devices hosting the specified zones. For example, it can be seen in FIG. 3 that the firewall control point 306 that is directly coupled to GGSN 308 controls a zone of other firewall control points. Each GTP monitoring point 302 may be associated with exactly one GTP PDP context deletion monitor instance. However, a firewall control point may be a member of multiple GTP PDP context deletion monitor instances for flexibility in managing networks with more than one layer of firewall security on the Gi interface or external network.

The GTP PDP context deletion monitor feature may be used while a monitoring or control point is configured for in-line filtering of the GTP traffic or in a configuration in which the point is operated "out-of-line," i.e., monitoring the GTP traffic on one or more unidirectional network "taps." An example of a network tap is the Shomiti Century Tap. It is also possible to tap the monitored network by using Ethernet switches that provide a monitoring point or port for that purpose. If such a switch is used, the service provider should assure that the monitoring point can handle the traffic rate that is expected to be transmitted through the switch.

Alternatively, a single monitoring or control point can be simultaneously filtering traffic in-line on some ports and passively monitoring GTP traffic on other ports. Furthermore, a single monitoring or control point can host multiple GTP monitoring points to simultaneously monitor traffic on multiple links for different GTP PDP context deletion monitor instances. The monitoring or control point partition feature can be used to create one partition to monitor the GTP backbone (Gn), and one or more additional partitions that filter traffic on the Gi interface.

The GTP PDP context deletion monitor feature also support tracking of the source address translation of terminated sessions so that the session can be terminated in all firewalls that are traversed by the session in both original and in address translated form. The feature works as follows. When a target session is terminated by a termination request that is associated with this feature, the session will be examined to determine whether or not the target address has been translated by the firewall that is terminating the session. If address translation has occurred for the session, then a message will be reliably delivered to the central server to announce the termination of a translated session. The message will report both the target and the translated IP address for the session as well as timestamps indicating the creation and termination times of the session.

Upon receiving these messages, the central server will consult a second pre-configured list of brick-zone pairs associated with the GTP PDP context deletion monitor instance. Again, a "brick" refers to a computing device functioning as either a control point or a monitoring point. Session termination requests will be sent to these destinations for the IP address to which the original source address was translated. Multiple levels of address translation can be accommodated by this mechanism.

Furthermore, the feature is designed for robust operation and does not require the dynamic state of PDP contexts to be continuously tracked in the central server as PDP contexts are created and deleted. To achieve this, GTP delete PDP context messages are monitored by the brick to determine when Gi sessions using the associated PDP address can be safely terminated. Secondary contexts associated with the same PDP address may be created and deleted over the course of the session and when the last context associated with the PDP address is deleted, the release of the associated PDP address will be reported to the central server. This is signaled in the GTPv1protocol by the SGSN sending a delete PDP context request message to the GGSN with a teardown indicator IE whose value set to '1.' The standard requires that the SGSN send this indicator if all of the contexts associated with a particular PDP address are to be deleted or if the last PDP context associated with the PDP address is to be deleted. Consequently, the GTPv1protocol provides a reliable indication of the release of the associated PDP address. The GTPv0 protocol does not support secondary PDP contexts and the GTPv0 delete PDP context request message is a reliable indicator of the release of the associated PDP address.

Delete context events will be generated by the firewall at receipt of a GTPv0 delete PDP context response message or at the receipt of a GTPv1 delete PDP context request message containing a teardown indicator IE whose value set to '1.'

The event will contain the PDP address assigned to the mobile station and the GTP PDP context deletion monitor instance ID that was assigned to this monitoring point. The termination event is signaled to the central server using reliable event reporting mechanisms supported by the firewall. These messages are expected to be acknowledged by the central server and are retransmitted if an acknowledgement is not promptly received. This retransmission uses existing mechanisms already provided in the firewall for this purpose.

When the central server receives notification of a PDP context deletion, the associated target monitor instance is located using as a key the GTP PDP context deletion monitor instance ID contained within the notification message.

If a valid monitor instance is located for this key, then tables associated with the instance are referenced to determine which zones and, for each named zone, which firewalls are to be notified of the event. The reason for allowing a subset of the bricks in any zone to be selected is to reduce the load on bricks that are known not to host target sessions but which may host a zone traversed by target sessions on other bricks.

When such a request has been received by the firewall/brick, a session termination request record will be queued for the target zone. This list is referenced during periodic traversals of the session state information for the zone.

When a firewall session is encountered during such a traversal that matches the termination criterion, the session record is marked for deletion. Since traversal of state information is incremental, a counter/flag is used to assure that all of the session state records for the zone have been examined at least once and no more than twice.

Figure 4:
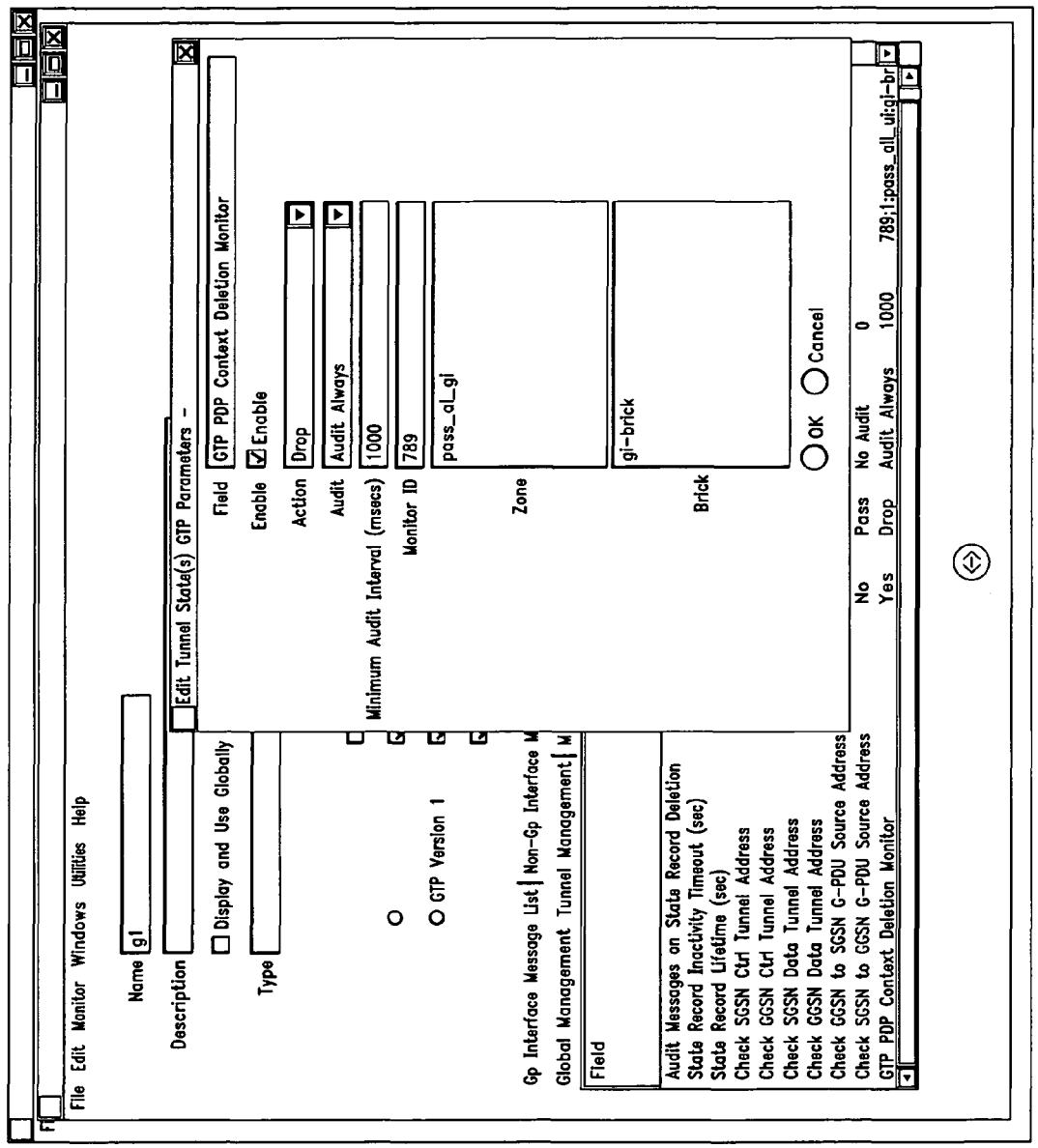
FIG. 4 is a diagram illustrating a user interface at a central server for use by a network administrator, according to one embodiment of the invention.

FIG. 4 is a diagram illustrating a user interface at a central server for use by a network administrator, according to one embodiment of the invention.

The GTP PDP context deletion monitor feature is configured through graphical user interface or GUI elements provided within the configuration user interface of the GTP application filter. An example of the user interface is shown in FIG. 4. The user interface elements allow the administrator to enable and disable the feature and to specify an integer value to identify the GTP PDP context deletion monitor instance associated with the GTP application filter instance. The configuration user interface provides GUI elements to allow the administrator to enumerate, for each GTP PDP context deletion monitor instance, every zone/brick combination which constitutes a firewall control point. There may be many firewall control points for each GTP PDP context deletion monitor instance and multiple GTP PDP context deletion monitor instances may contain the same firewall control points.

Configuration options are provided to the administrator to generate audit messages when termination events are generated by a GTP monitoring point. These are enabled through the GTP application filter.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for controlling an attribute associated with a communication session in a data communication network, comprising the steps of:
    selecting at a first computing device one or more monitoring points and one or more firewall control points distributed in the data communication network, wherein the first computing device functionally serves as a centralized controller;
    monitoring at the first computing device the attribute associated with the communication session, wherein the first computing device monitors the attribute via one or more messages received from the one or more selected monitoring points;
    determining at the first computing device which computing devices in the data communication network are to be made aware of the monitored attribute, wherein at least one of the computing devices to be made aware of the monitored attribute comprises at least one of the one or more selected firewall control points; and
    sending a message from the first computing device to each computing device identified in the determining step, wherein the first computing device controls the at least one of the one or more selected firewall control points via the sent message.

2. The method of claim 1, wherein the first computing device comprises a server.

3. The method of claim 1, wherein the attribute comprises an occurrence of a communication session termination event.

4. The method of claim 3, wherein the termination event represents a closure of a communication tunnel with which the communication session is associated.

5. The method of claim 4, wherein the tunnel comprises at least one of the group consisting of a General Packet Radio Service tunnel and a Universal Mobile Telecommunications System tunnel.

6. The method of claim 1, wherein one or more of the monitoring, determining, and sending steps are performed in accordance with a firewall that performs a network address translation operation such that the attribute is controlled in an original form and in an address translated form.

7. The method of claim 1, further comprising the step of resending the message from the first computing device to a computing device identified in the determining step when the first computing device does not receive an acknowledgment of receipt of the message from the computing device.

8. The method of claim 1, further comprising the step of using a user interface associated with the first computing device to select the one or more monitoring points and the one or more firewall control points in the data communication network.

9. Apparatus for controlling an attribute associated with a communication session in a data communication network, comprising:
    a memory; and
    at least one functionally centralized processor coupled to the memory and operative to: (i) select one or more monitoring points and one or more firewall control points distributed in the data communication network; (ii) monitor the attribute associated with the communication session via one or more messages received from the one or more selected monitoring points; (iii) determine which computing devices in the data communication network are to be made aware of the monitored attribute, wherein at least one of the computing devices to be made aware of the monitored attribute comprises at least one of the one or more selected firewall control points; and (iv) send a message to each computing device identified in the determining operation, so as to control the at least one of the one or more selected firewall control points via the sent message.

10. The apparatus of claim 9, wherein the attribute comprises an occurrence of a communication session termination event.

11. The apparatus of claim 10, wherein the termination event represents a closure of a communication tunnel with which the communication session is associated.

12. The apparatus of claim 11, wherein the tunnel comprises at least one of the group consisting of a General Packet Radio Service tunnel and a Universal Mobile Telecommunications System tunnel.

13. The apparatus of claim 9, wherein one or more of the monitoring, determining, and sending operations are performed in accordance with a firewall that performs a network address translation operation such that the attribute is controlled in an original form and in an address translated form.

14. The apparatus of claim 9, wherein the at least one processor is further operative to resend the message to a computing device identified in the determining operation when an acknowledgment of receipt of the message is not received from the computing device.

15. The apparatus of claim 9, wherein the at least one processor is further operative to enable use of a user interface to select the one or more monitoring points and the one or more firewall control points in the data communication network.

16. Apparatus for controlling an attribute associated with a communication session in a data communication network, comprising:
- means for selecting at a first computing device one or more monitoring points and one or more firewall control points distributed in the data communication network, wherein the first computing device functionally serves as a centralized controller;
- means for monitoring at the first computing device the attribute associated with the communication session, wherein the first computing device monitors the attribute via one or more messages received from the one or more selected monitoring points;
- means for determining at the first computing device which computing devices in the data communication network are to be made aware of the monitored attribute, wherein at least one of the computing devices to be made aware of the monitored attribute comprises at least one of the one or more selected firewall control points; and
- means for sending a message from the first computing device to each computing device identified by the determining means, wherein the first computing device controls the at least one of the one or more selected firewall control points via the sent message.

17. Apparatus for controlling an attribute associated with a communication session in a data communication network, comprising: a functionally centralized server comprising a memory, the server being operative to: (i) select one or more monitoring points and one or more firewall control points distributed in the data communication network; (ii) monitor the attribute associated with the communication session via one or more messages received from the one or more selected monitoring points; (iii) determine which computing devices in the data communication network are to be made aware of the monitored attribute, wherein at least one of the computing devices to be made aware of the monitored attribute comprises at least one of the one or more selected firewall control points; and (iv) send a message to each computing device identified in the determining operation, so as to control the at least one of the one or more selected firewall control points via the sent message.

18. The method of claim 1, wherein the one or more monitoring points are distributed in a backbone portion of the data communication network and the one or more firewall control points are distributed in a portion of the data communication network external to the backbone portion.

19. The method of claim 1, wherein at least one of the one or more firewall control points controls a zone of one or more other firewall control points.

* * * * *